United States Patent Office 2,947,735
Patented Aug. 2, 1960

2,947,735

PROCESS FOR THE PRODUCTION OF COPOLYMERS OF ETHYLENE

Herbert Bartl, Koln-Stammheim, Germany, assignor to Farbenfabriken Bayer Aktiengesellschaft, Leverkusen, Germany, a corporation of Germany No Drawing. Filed Dec. 19, 1957, Ser. No. 703,763

6 Claims. (Cl. 260—87.3)

The present invention relates to a process for the production of copolymers of ethylene and a vinyl ester, and more especially of copolymers of ethylene and vinylacetate or/and vinylpropionate.

It is known that the copolymerization of ethylene and vinylacetate can be carried out in a solution of tertiary butyl alcohol. By this known process hitherto only copolymers with a relatively high content of vinylacetate were obtained which are soft and tacky products.

For the copolymerization of ethylene and vinylacetate or/and vinyl propionate, it has now been found that copolymers with a relatively low content of said vinyl esters having outstanding strength and extensibility values can be obtained if the copolymerization is carried out in a homogeneous liquid phase containing predominantly tertiary butyl alcohol under the conditions nearer defined below.

In practice, the procedure is that the vinylester, that is to say the vinylacetate and/or vinyl propionate, is diluted with pure tertiary butyl alcohol, or besides tertiary butyl alcohol water is only used in such a proportion as can be taken up by the tertiary butanol-vinyl ester mixture with maintenance of a homogeneous phase. The quantity of water is generally less than the quantity of tertiary butyl alcohol.

The vinyl ester content of the resulting copolymer is substantially determined by the proportion of tertiary butanol and ethylene to vinylester. Copolymers with improved strength and extensibility which are preferred are those in which less than 35% of the aforementioned vinyl esters has been incorporated by polymerization. This composition is obtained if the vinyl ester is diluted with 3 to 10 times its weight of tertiary butanol, the proportion by weight of ethylene to vinylester varying between 2:1 to 20:1. If the ethylene and the butanol are applied in lower proportions, copolymers are obtained which have a higher content of vinyl ester, said copolymer being not suitable for the production of films, foils and molded articles in view of their inferior qualities.

The presence of even a small proportion of water during the polymerization unexpectedly leads to a substantial increase in the yield of polymer, it being readily possible, by adjusting the proportion of water, to obtain any desired pH values, preferably pH values from 3 to 7, for accelerating the decomposition of activator into radicals. The amount of water is lower than the amount of tertiary butanol and is so adjusted that the reaction mixture forms a homogeneous phase. Although the amount of polymerization catalyst may vary within wide limits, it is employed generally in proportion of from 0, 1 to about 5% of the total weight of monomers.

Organic free radical forming compounds such as lauroyl peroxide, acetyl peroxide, peroxy dicarbonates, benzoyl peroxide, dichlorobenzoyl peroxide or an α,α-azodiisobutyric acid nitrile are preferably used as polymerization activators.

The copolymerization can be carried out at pressures higher than 10 atm., preferably at 200–700 atm. It is of course possible to use even higher pressures. The reaction temperatures should be 10–200° C., preferably 30 to 150° C.

Copolymers so produced have 3 to 35% vinyl ester by weight incorporated by polymerization. These are highly suitable for the production of foil material or molded articles; moreover, the copolymers with a content of 15 to 35% of vinyl acetate incorporated by polymerization are elastomeric as well as producing foils with good transparency and pliability.

Copolymers with a vinyl ester content greater than 35% are soft, and compounds which are not suitable for the production of films, foils and molded articles.

*Example 1*

200 cc. of water brought by means of dilute hydrochloric acid to a pH value of 4, 4,800 cc. of tertiary butyl alcohol and 7 g. of α,α-azodiisobutyric acid nitrile dissolved in 800 cc. of vinyl acetate are placed in a 20 l. stainless steel autoclave equipped with a stirrer device and atmospheric oxygen is completely displaced by flushing with ethylene which is as far as possible free from oxygen. Ethylene is forced into the autoclave until a pressure of 100 atm. is reached, whereafter the contents of the autoclave are quickly heated to 63° C. Thereafter, more ethylene is added until a pressure of 400 atm. is reached. As soon as the pressure starts to fall, fresh ethylene is supplied, so that an ethylene pressure of about 400 atm. is maintained throughout the entire polymerization period. After 18 hours, the contents of the autoclave are cooled, the excess ethylene is released and the autoclave is opened. The polymerization product is dried. The yield is 1600 g. The polymer contains 14% of incorporated vinyl acetate, has a strength of 163 kg./cm.$^2$ and an elongation of 650%. The limiting viscosity factor ($\eta$), measured in p-xylene, is 1.10.

If the same operation is repeated, but in the absence of water, a yield of only 700 g. of polymer is obtained. The polymer has, however, the same properties.

*Example 2*

The experiment described in Example 1 is repeated except that the quantity of tertiary butyl alcohol is 2,000 g. and the quantity of water is 3,000 g. The yield of polymer in this case is 2,300 g. The polymer has a strength of 125 kg./cm.$^2$, an elongation of 450% and a limiting viscosity factor ($\eta$) of 1.67 (measured in p-xylene). The amount of vinyl acetate incorporated by polymerization is 14%.

Thus, if the polymerization is carried out in the presence of predominant quantities of water, the vinyl ester and some of the tertiary butyl alcohol forming one phase, and water with the remainder of the tertiary butyl alcohol forming a second liquid phase, copolymers are obtained which have considerably lower strength and elongation values.

*Example 3*

400 cc. of water, brought by means of dilute hydrochloric acid to a pH value of 4, 9,600 cc. of tertiary butyl alcohol and 8 g. of α,α-azodiisobutyric acid nitrile dissolved in 1,000 cc. of vinyl acetate are introduced into a stainless steel autoclave equipped with a stirrer device and having a capacity of 20 litres, whereafter the atmospheric oxygen is completely displaced by flushing with ethylene which is as far as possible free from oxygen. Ethylene is forced into the autoclave until a pressure of 100 atm. is reached, the contents of the autoclave being quickly heated to 63° C. Thereafter, more ethylene is introduced until a pressure of 400 atm. is reached. As soon as the pressure starts to fall, fresh ethylene is supplied, so that an ethylene pressure of about 400 atm.

is maintained throughout the entire polymerization period. After 18 hours, the autoclave is cooled, the excess ethylene is released and the autoclave is opened. The polymerization product is dried, the yield being 1,900 g. The polymer contains 20% of incorporated vinyl acetate, has a strength of 207 kg./cm.$^2$ and an elongation of 760%. The limiting viscosity factor ($\eta$) is 0.91 (measured in p-xylene). Transparent foils which are elastomeric and have a pliable feel can be made from the copolymer by an ordinary extrusion process using a temperature of about 150° C. for the melt.

Copolymers of ethylene and vinyl propionate of similar properties are obtained if the aforementioned process is repeated while replacing the vinyl acetate by an equimolecular amount of vinyl propionate.

What I claim is:

1. A process for the production of a novel copolymer which comprises copolymerizing ethylene and at least one vinyl ester selected from the group consising of vinyl acetate and vinyl propionate, in a homogeneous liquid phase consisting essentially of tertiary butyl alcohol and said vinyl ester, at temperatures between 10° and 200° C. and at a pressure of at least 10 atm. in the presence of an organic free radical-forming polymerization catalyst and in the absence of an emulsifying agent, said tertiary butyl alcohol being present in an amount by weight of 3 to 10 times to that of vinyl ester, the ethylene and said vinyl ester being used in a proportion by weight varying between 2:1 and 20:1, to produce copolymers in which the vinyl ester is present in an amount not surpassing 35 percent by weight.

2. The process of claim 1, wherein said polymerization catalyst is an organic peroxy compound.

3. The process of claim 1, wherein said polymerization catalyst is an $\alpha,\alpha'$-azodiisobutyric acid nitrile.

4. A process for the production of a novel copolymer which comprises copolymerizing ethylene and at least one vinyl ester selected from the group consisting of vinyl acetate and vinyl propionate, in a homogeneous liquid phase having a pH of 3–7 and consisting essentially of teritary butyl alcohol, said vinyl ester, and water in a proportion which can be absorbed by the tertiary butyl alcohol-vinyl ester mixture with maintenance of homogeneous phase, the water being present in smaller amounts than said tertiary butyl alcohol, said copolymerization being conducted at temperatures between 10 and 200° C. and at a pressure of at least 10 atm. in the presence of an organic free radical-forming polymerization catalyst and in the absence of an emulsifying agent, said tertiary butyl alcohol being present in an amount by weight of 3 to 10 times that of vinyl ester, the ethylene and said vinyl ester being used in a proportion by weight varying between 2:1 and 20:1, to produce copolymers in which the vinyl ester is present in an amount not surpassing 35 percent by weight.

5. The process of claim 4, wherein said polymerization catalyst is an organic peroxy compound.

6. The process of claim 4, wherein said polymerization catalyst is an $\alpha,\alpha'$-azodiisobutyric acid nitrile.

References Cited in the file of this patent

UNITED STATES PATENTS

| | | |
|---|---|---|
| 1,890,060 | Lawson | Dec. 6, 1932 |
| 2,439,528 | Roedel | Apr. 13, 1948 |
| 2,462,678 | Roedel | Feb. 22, 1949 |
| 2,582,055 | Minsk et al. | Jan. 8, 1952 |
| 2,703,794 | Roedel | Mar. 8, 1955 |